(12) United States Patent
Gedik et al.

(10) Patent No.: US 9,237,192 B2
(45) Date of Patent: *Jan. 12, 2016

(54) METHOD AND APPARATUS FOR ADAPTIVE IN-OPERATOR LOAD SHEDDING

(71) Applicant: International Business Machines Corporation, Armonk, NY (US)

(72) Inventors: Bugra Gedik, Atlanta, GA (US); Kun-Lung Wu, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/896,709

(22) Filed: May 17, 2013

(65) Prior Publication Data
US 2013/0254350 A1    Sep. 26, 2013

Related U.S. Application Data

(63) Continuation of application No. 12/164,671, filed on Jun. 30, 2008, now Pat. No. 8,478,875, which is a continuation of application No. 11/447,433, filed on Jun. 5, 2006, now abandoned.

(51) Int. Cl.
| | |
|---|---|
| H04L 29/08 | (2006.01) |
| H04L 12/801 | (2013.01) |
| H04L 12/815 | (2013.01) |
| H04L 12/891 | (2013.01) |
| H04L 12/861 | (2013.01) |
| H04L 12/879 | (2013.01) |
| H02J 3/14 | (2006.01) |

(52) U.S. Cl.
CPC ............. *H04L 67/10* (2013.01); *H04L 47/10* (2013.01); *H04L 47/225* (2013.01); *H04L 47/41* (2013.01); *H04L 49/90* (2013.01); *H04L 49/901* (2013.01); *H02J 3/14* (2013.01); *Y02B 60/33* (2013.01); *Y04S 20/224* (2013.01)

(58) Field of Classification Search
None
See application file for complete search history.

(56) References Cited

U.S. PATENT DOCUMENTS

| | | |
|---|---|---|
| 5,878,224 A | 3/1999 | Smith |
| 6,088,622 A | 7/2000 | Dollin et al. |
| 6,738,762 B1 | 5/2004 | Chen et al. |
| 6,751,619 B1 | 6/2004 | Rowstron et al. |
| 7,010,538 B1 | 3/2006 | Black |
| 7,031,884 B1 | 4/2006 | Radulovic et al. |

(Continued)

OTHER PUBLICATIONS

A. Arasu, et al., "Stream: The Stanford Stream Data Manager," The Stream Group, Stanford University, IEEE Data Engineering Bulletin, 26(1), Mar. 2003.

(Continued)

*Primary Examiner* — Greg C Bengzon
(74) *Attorney, Agent, or Firm* — Jeff Tang

(57) ABSTRACT

One embodiment of the present method and apparatus adaptive in-operator load shedding includes receiving at least two data streams (each comprising a plurality of tuples, or data items) into respective sliding windows of memory. A throttling fraction is then calculated based on input rates associated with the data streams and on currently available processing resources. Tuples are then selected for processing from the data streams in accordance with the throttling fraction, where the selected tuples represent a subset of all tuples contained within the sliding window.

20 Claims, 5 Drawing Sheets

(56) References Cited

U.S. PATENT DOCUMENTS

| | | | |
|---|---|---|---|
| 7,031,928 B1 | 4/2006 | Cochran | |
| 7,133,808 B2 | 11/2006 | Radulovic et al. | |
| 7,158,479 B1 | 1/2007 | Noble | |
| 7,203,621 B1 | 4/2007 | Veitch et al. | |
| 7,324,444 B1 | 1/2008 | Liang et al. | |
| 7,383,253 B1 | 6/2008 | Tsimelzon et al. | |
| 7,415,390 B2 | 8/2008 | Radulovic et al. | |
| 7,536,396 B2 | 5/2009 | Johnson et al. | |
| 7,580,812 B2 | 8/2009 | Ariyur et al. | |
| 7,844,581 B2 | 11/2010 | Dubnicki et al. | |
| 8,396,886 B1* | 3/2013 | Tsimelzon et al. | 707/769 |
| 2004/0010488 A1* | 1/2004 | Chaudhuri et al. | 707/3 |
| 2006/0020579 A1* | 1/2006 | Freedman et al. | 707/3 |
| 2006/0085463 A1* | 4/2006 | Chaudhuri et al. | 707/100 |
| 2006/0085592 A1* | 4/2006 | Ganguly et al. | 711/114 |
| 2007/0226188 A1* | 9/2007 | Johnson et al. | 707/3 |
| 2007/0226239 A1* | 9/2007 | Johnson et al. | 707/101 |
| 2007/0276786 A1* | 11/2007 | Piedmonte | 707/2 |
| 2007/0276802 A1* | 11/2007 | Piedmonte | 707/3 |
| 2009/0138428 A1* | 5/2009 | Thomsen | 707/2 |
| 2010/0042606 A1 | 2/2010 | Srivastava et al. | |
| 2011/0010358 A1 | 1/2011 | Zane et al. | |
| 2012/0066255 A1 | 3/2012 | Kenedy et al. | |

OTHER PUBLICATIONS

A.M. Ayad, et al., "Static Optimization of Conjunctive Queries with Sliding Windows Over Infinite Streams," Department of Computer Sciences, University of Wisconsin—Madison, SIGMOD 2004, Jun. 13-18, 2004, Paris, France.

A. Ayad, J. Naughton, "Static Optimization of Conjunctive Queries with Sliding Windows Over Infinite Streams," Department of Computer Sciences, University of Wisconsin, *SIGMOD 2004*, Jun. 13-18, 2004, Paris France, comprises 12 unnumbered pages.

N. Tatbul, U. Cetintemel, S. Zdonik, M. Cherniack, M. Stonebraker; "Load Shedding in a Data Stream Manager," Department of Computer Science, Brown University, Mar. 2003, comprises 13 unnumbered pages.

A. Arasu, B. Babcock, S. Babu, M. Datar, K. Ito, R. Motwani, I. Nishizawa, U. Srivastava, D. Thomas, R. Varma, J. Widom, "Stream: The Stanford Stream Data Manager," IEEE Data Engineering Bulletin, 26(1), 2003, pp. 1-8.

B. Babcock, S. Babu, M. Datar, R. Motwani, J. Widom, "Models and Issues in Data Stream Systems," In Proc. ACM Symp. on Principles of Database Systems (PODS), 2002, comprises 16 unnumbered pages.

H. Balakrishnan, M. Balazinska, D. Carney, U. Cetintemel, M. Cherniack, C. Convey, E. Galvez, J. Salz, M. Stonebraker, N. Tatbul, R. Tibbetts, S. Zdonik, "Retrospective on Aurora," VLDB Journal, 13(4), Dec. 2004, comprises 16 unnumbered pages.

S. Chandrasekaran, O. Cooper, A. Deshpande, M. Franklin, J. Hellerstein, W. Hong, S. Krishnamurthy, S. Madden, V. Raman, F. Reiss, M. Shah, "TelegraphCQ: Continuous Dataflow Processing for an Uncertain World," 1st CIDR Conf., Jan. 2003, Asilomar, CA., comprises 12 unnumbered pages.

S. Chandrasekaran, M. Franklin, "Remembrance of Streams Past: Overload-Sensitive Management of Archived Streams,". Proceedings of the $30^{th}$ VLDB Conference, 2004, Toronto, Canada, comprises 12 unnumbered pages.

A. Das, J. Gehrke, M. Riedewald, "Approximate Join Processing Over Data Streams," Proc. of the the 2003 ACM SIGMOD International Conference on Management of Data, comprises 12 unnumbered pages.

B. Gedik, KL. Wu, P. Yu, L. Liu, "Adaptive Load Shedding for Windowed Stream Joins," Conference on Information and Knowledge Management 2005, Oct. 31-Nov. 5, 2005, Bremen, Germany, pp. 171-178.

L. Golab, S. Garg, M. Özsu, "On Indexing Sliding Windows over On-line Data Streams," University of Waterloo Technical Report, Sep. 2003, pp. 1-21.

L. Golab, M. Özsu, "Processing Sliding Window Multi-Joins in Continuous Queries over Data Streams," School of Computer Science, University of Waterloo, Technical Report, Feb. 2003, pp. 1-28.

M. Hammad, W. Aref, A. Elmagarmid, "Stream Window Join: Tracking Moving Objects in Sensor-Network Databases," Proceedings of the $15^{th}$ International Conference on Scientific and Statistical Database Mangement (SSDBM '03), 2003, comprises 10 unnumbered pages.

S. Helmer, T. Westmann, G. Moerkotte, "Diag-Join: An Opportunistic Join Algorithm for 1:N Relationships," Proc. of the Conf. on Very Large Data Bases, New York, Aug. 1998, pp. 1-20.

J. Kang, J. Naughton, S. Viglas, "Evaluating Window Joins over Unbounded Streams," Proc. of the $28^{th}$ VLDB Conference, Hong, Kong, China, 2002, comprises 12 unnumbered pages.

C. Pu, L. Singaravelu, "Fine-Grain Adaptive Compression in Dynamically Variable Networks," Proc. of the $25^{th}$ IEEE International Conference on Distributed Computing Systems (ICSCS '05), 2005, pp. 1-10.

U. Srivastava, J. Widom, "Memory-Limited Execution of Windowed Stream Joins," Proc. of the $30^{th}$ VLDB Conference, Toronto, Canada, 2004, pp. 324-335.

N. Tatbul, U. Cetintemel, S. Zdonik, M. Cherniack, M. Stonebraker, "Load Shedding in a Data Stream Manager," Proceedings of VLDB, Berlin, Germany, 2003, comprises 12 unnumbered pages.

N. Tatbul, S. Zdonik, "Window-Aware Load Shedding for Data Streams," Brown University, Department of Computer Science, Sep. 2004, comprises 12 unnumbered pages.

S. Viglas, J. Naughton, J. Burger, "Maximizing the Output Rate of Multi-Way Join Queries over Streaming Information Sources," Proceedings of the $29^{th}$ VLDB Conference, Berlin, Germany, 2003, comprises 12 unnumbered pages.

J. Xie, J. Yang, Y. Chen, "On Joining and Caching Stochastic Streams," In Proc. of the 2005 ACM SIGMOD International Conference on Management of Data (SIGMOD '05), Baltimore, Maryland, USA, Jun. 2005, comprises 12 unnumbered pages.

* cited by examiner

METHOD AND APPARATUS FOR ADAPTIVE IN-OPERATOR LOAD SHEDDING

CROSS REFERENCE TO RELATED APPLICATIONS

This application is a continuation of co-pending U.S. patent application Ser. No. 12/164,671, filed Jun. 30, 2008, which in turn is a continuation of U.S. patent application Ser. No. 11/447,433, filed Jun. 5, 2006 (abandoned). Both of these applications are herein incorporated by reference in their entireties.

REFERENCE TO GOVERNMENT FUNDING

This invention was made with Government support under Contract No. H98230-04-3-0001 awarded by the U.S. Department of Defense. The Government has certain rights in this invention.

BACKGROUND

The present invention relates generally to data stream processing and relates more particularly to the optimization of data stream operations.

With the proliferation of Internet connections and network-connected sensor devices comes an increasing rate of digital information available from a large number of online sources. These online sources continually generate and provide data (e.g., news items, financial data, sensor readings, Internet transaction records, and the like) to a network in the form of data streams. Data stream processing units are typically implemented in a network to receive or monitor these data streams and process them to produce results in a usable format. For example, a data stream processing unit may be implemented to perform a join operation in which related data items from two or more data streams (e.g., from two or more news sources) are culled and then aggregated or evaluated, for example to produce a list of results or to corroborate each other.

However, the input rates of typical data streams present a challenge. Because data stream processing units have no control over the sometimes sporadic and unpredictable rates at which data streams are input, it is not uncommon for a data stream processing unit to become loaded beyond its capacity, especially during rate spikes. Typical data stream processing units deal with such loading problems by arbitrarily dropping data streams (e.g., declining to receive the data streams). While this does reduce loading, the arbitrary nature of the strategy tends to result in unpredictable and sub-optimal data processing results, because data streams containing useful data may unknowingly be dropped while data streams containing irrelevant data are retained and processed.

Thus, there is a need in the art for a method and apparatus for adaptive in-operator load shedding.

SUMMARY OF THE INVENTION

One embodiment of the present method and apparatus adaptive in-operator load shedding includes receiving at least two data streams (each comprising a plurality of tuples, or data items) into respective sliding windows of memory. A throttling fraction is then calculated based on input rates associated with the data streams and on currently available processing resources. Tuples are then selected for processing from the data streams in accordance with the throttling fraction, where the selected tuples represent a subset of all tuples contained within the sliding window.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for adaptive in-operator load shedding, e.g., for data stream operations. Embodiments of the present invention make it possible for load shedding to be performed in an "intelligent" (e.g., non-arbitrary) manner, thereby maximizing the quality of the data stream operation output (e.g., in terms of a total number of output items generated or in terms of the value of the output generated). To accomplish this, the present invention introduces the novel concepts of operator throttling and window harvesting to optimize the data stream processing results. The present invention may be particularly useful when applied, for example, to multi-way, windowed data stream joins Within the context of the present invention, the term "tuple" may be understood to be a discrete data item within a stream of data (e.g., where the stream of data may comprise multiple tuples).

Figure 1:
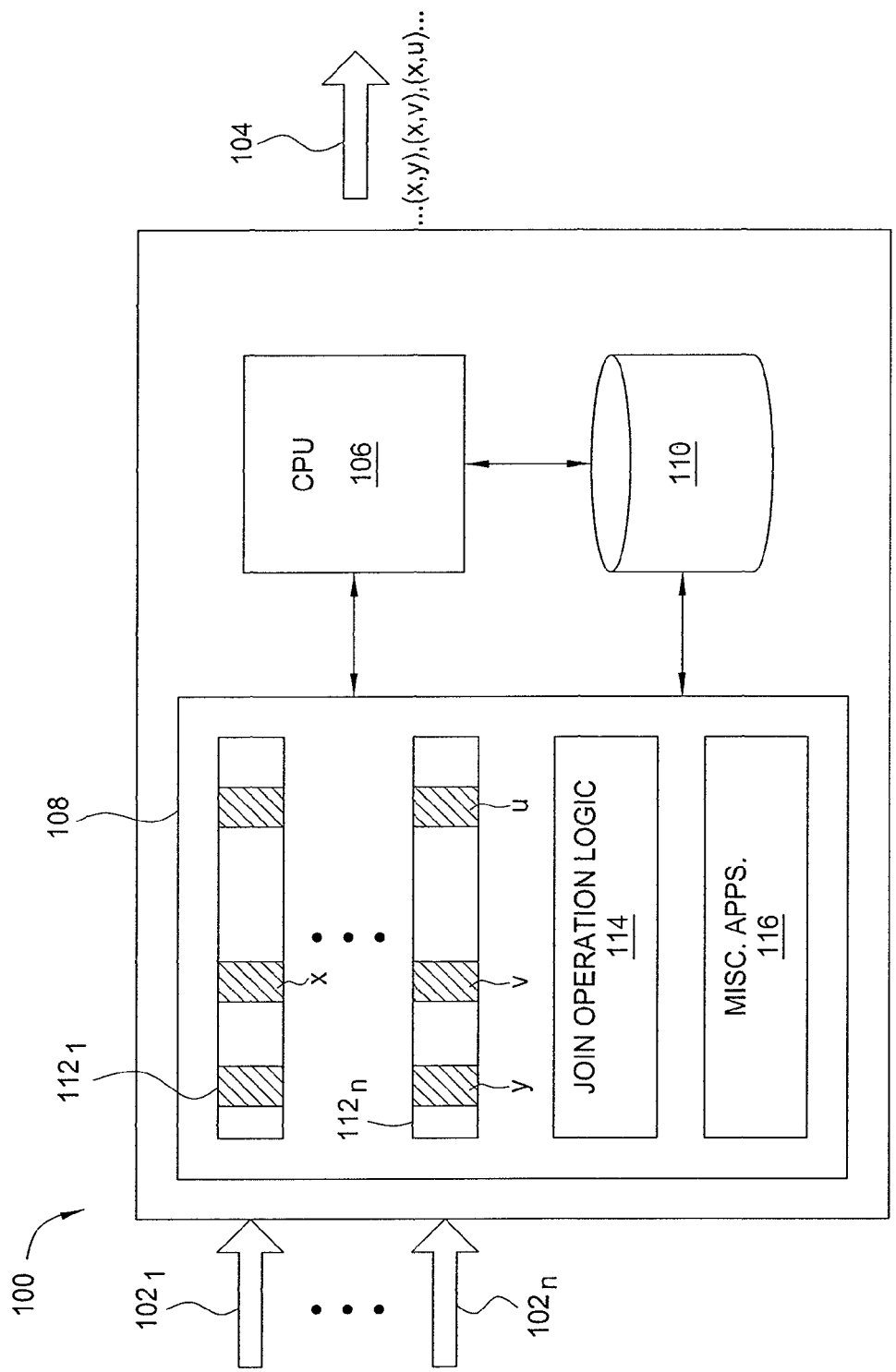
FIG. 1 is a schematic diagram illustrating one embodiment of a data stream processing unit adapted for use with the present invention.

FIG. 1 is a schematic diagram illustrating one embodiment of a data stream processing unit 100 adapted for use with the present invention. The data stream processing unit 100 illustrated in FIG. 1 is configured as a general purpose computing device and is further configured for performing multi-way, windowed data stream joins. Although the present invention will be described within the exemplary context of multi-way data stream joins, those skilled in the art will appreciate that the teachings of the invention described herein may be applied to optimize a variety of data stream operations, including filtering, transforming and the like.

As illustrated, the data stream processing unit 100 is configured to receive two or more input data streams $102_1$-$102_n$ (hereinafter collectively referred to as "input data streams 102"), e.g., from two or more different data sources (not shown), and process these input data streams 102 to produce a single output data stream 104. The data stream processing unit 100 thus comprises a processor (e.g., a central processing unit or CPU) 106, a memory 108 (such as a random access memory, or RAM) and a storage device 110 (such as a disk drive, an optical disk drive, a floppy disk drive or the like). Those skilled in the art will appreciate that some data stream processing units may be configured to receive only a single input data stream and still be adaptable for use with the present invention.

As each input data stream 102 is received by the data stream processing unit 100, tuples (e.g., discrete data items) from the input data streams 102 are stored in a respective sliding window $112_1$-$112_n$ (hereinafter collectively referred to as "sliding windows 112") in the memory 108. These sliding windows 112 are buffer memories that can be user-configurable or system-defined (e.g., based on available memory space) and may be count-based (e.g., configured to store "the last x tuples" of the input data streams) or time-based (e.g., configured to store "the last x seconds" of the input data streams). Thus, as a new tuple from an input data stream 102 arrives in a respective sliding window 112, the new tuple may force an existing tuple to leave the sliding window 112 (if the sliding window 112 was full before receipt of the new tuple). The memory 108 also stores program logic 114 for the adaptive load shedding method of the present invention, as well as logic 116 for other miscellaneous applications (e.g., system performance monitoring, alert generation, etc.). Alternatively, portions of the input data streams 102 and program logic 114 can be stored on the storage medium 110.

To perform a join operation, the processor 106 executes the program logic 114 stored in the memory 108 to process tuples from the input data streams 102 that are stored in the sliding windows 112. Specifically, the join operation is performed by comparing a tuple (e.g., tuple x) from a first sliding window $112_1$ with at least one tuple from at least a second sliding window $112_n$. If one or more tuples from the second sliding window $112_n$ (e.g., tuples y, v, and u) match the join condition for the tuple x, then the matching tuples will be joined such that the output data stream 104 will comprise one or more matched sets of tuples, e.g., (x, y), (x, v) and (x, u).

Thus, the adaptive load shedding method of the present invention may be represented by one or more software application (or even a combination of software and hardware, e.g., using Application Specific Integrated Circuits (ASIC)), where the software is loaded from a storage medium (e.g., storage device 110) and operated by the processor 106 in the memory 108 of the data stream processing unit 100. Thus, in one embodiment, the method for adaptive load shedding described in greater detail below can be stored on a computer readable medium or carrier (e.g., RAM, magnetic or optical driven or diskette, and the like).

Alternatively, the method for adaptive load shedding described in greater detail below can be represented as a discrete load shedding module (e.g., a physical device or subsystem that is coupled to the processor 106 through a communication channel) within the data stream processing unit.

Figure 2:
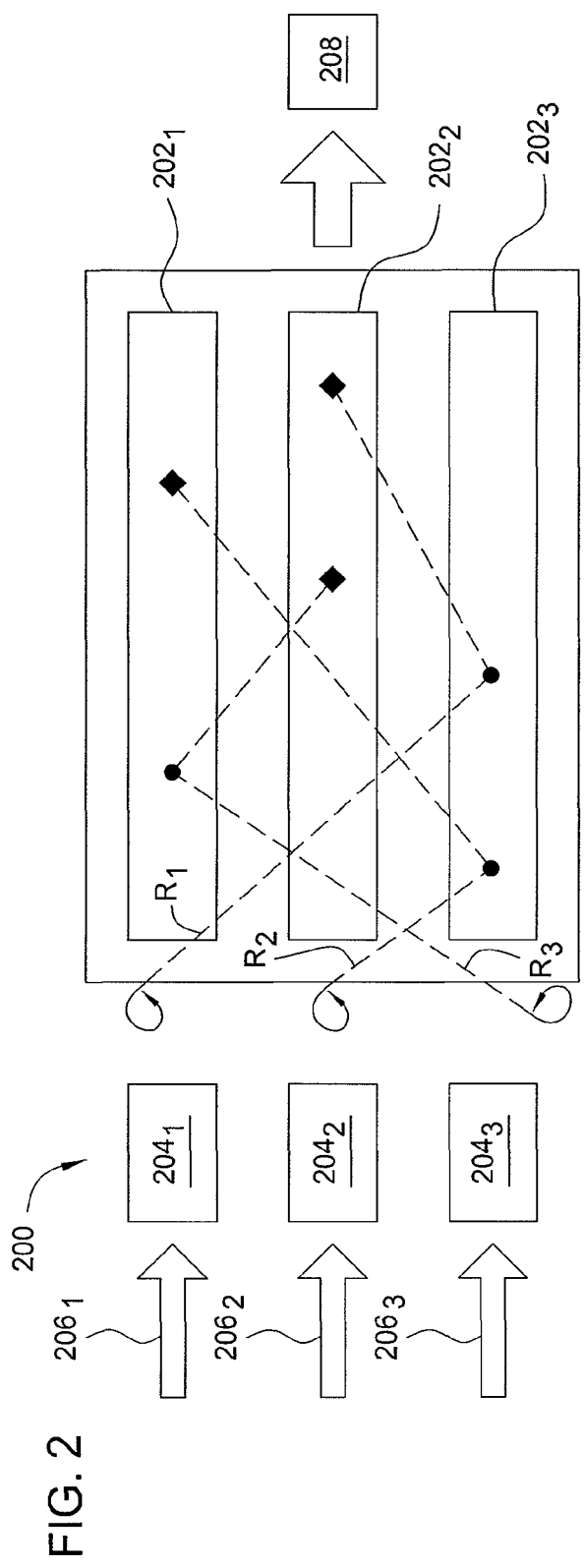
FIG. 2 is a schematic diagram illustrating a more detailed embodiment of an exemplary memory unit adapted for data stream processing, according to the present invention.

FIG. 2 is a schematic diagram illustrating a more detailed embodiment of an exemplary memory unit 200 adapted for data stream processing, according to the present invention. Specifically, the memory unit 200 may be implemented in a data stream processing unit such as the data stream processing unit 100 of FIG. 1, in order to perform a multi-way join operation on two or more incoming data streams.

The exemplary memory unit 200 is configured for a three-way stream join operation. To this end, the memory unit 200 comprises three windows $202_1$-$202_3$ (hereinafter collectively referred to as "windows 202"), each of which is associated with a respective input buffer $204_1$-$204_3$ (hereinafter collectively referred to as input buffers 204") that is separate from (i.e., not part of) the window 204. The memory unit 200 additionally comprises a single output buffer 208.

Each set of windows 202 and input buffers 204 is configured to receive a respective input data stream $206_1$-$206_3$ (hereinafter collectively referred to as "input data streams 206"). Specifically, the input buffers 204 are configured to temporarily buffer tuples from corresponding input data streams 206, while the windows 202 are configured to store tuples from the input buffers 204 that are fetched by a join operator (which performs data stream joins on tuples stored in the windows 202). The output buffer 208 is configured to store the results of data stream joins performed on tuples in the windows 202. Results stored in the output buffer 208 may be fetched by other stream operators.

In performing multi-way, windowed data stream joins, the join ordering (or sequence), R, is important. Different join orders can result in substantial differences in terms of computation time (i.e., for performing the join). For the purposes of the present invention, the join direction is defined by the identity of the first data stream in a join order, R.

Figure 3:
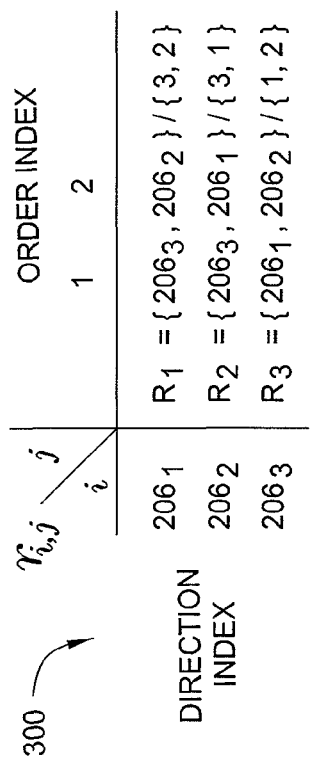
FIG. 3 is a tabular representation of the data streams illustrated in FIG. 2 and their respective join orders.

For example, FIG. 3 is a tabular representation 300 of the data streams ($206_1$, $206_2$ and $206_3$) illustrated in FIG. 2 and their respective join orders ($R_1$, $R_2$ and $R_3$). Referring simultaneously to FIGS. 2 and 3, if an input tuple arriving from data stream $206_2$ is first joined with tuples from data stream $206_3$, and then with tuples from data stream $206_1$, the join order, $R_2$, for data stream $206_2$ is $R_2=\{3, 1\}$. Similarly, the join orders, $R_1$ and $R_3$, respectively, for the data streams $206_1$ and $206_3$ reflect the order in which tuples from the other data streams are joined.

Figure 4:
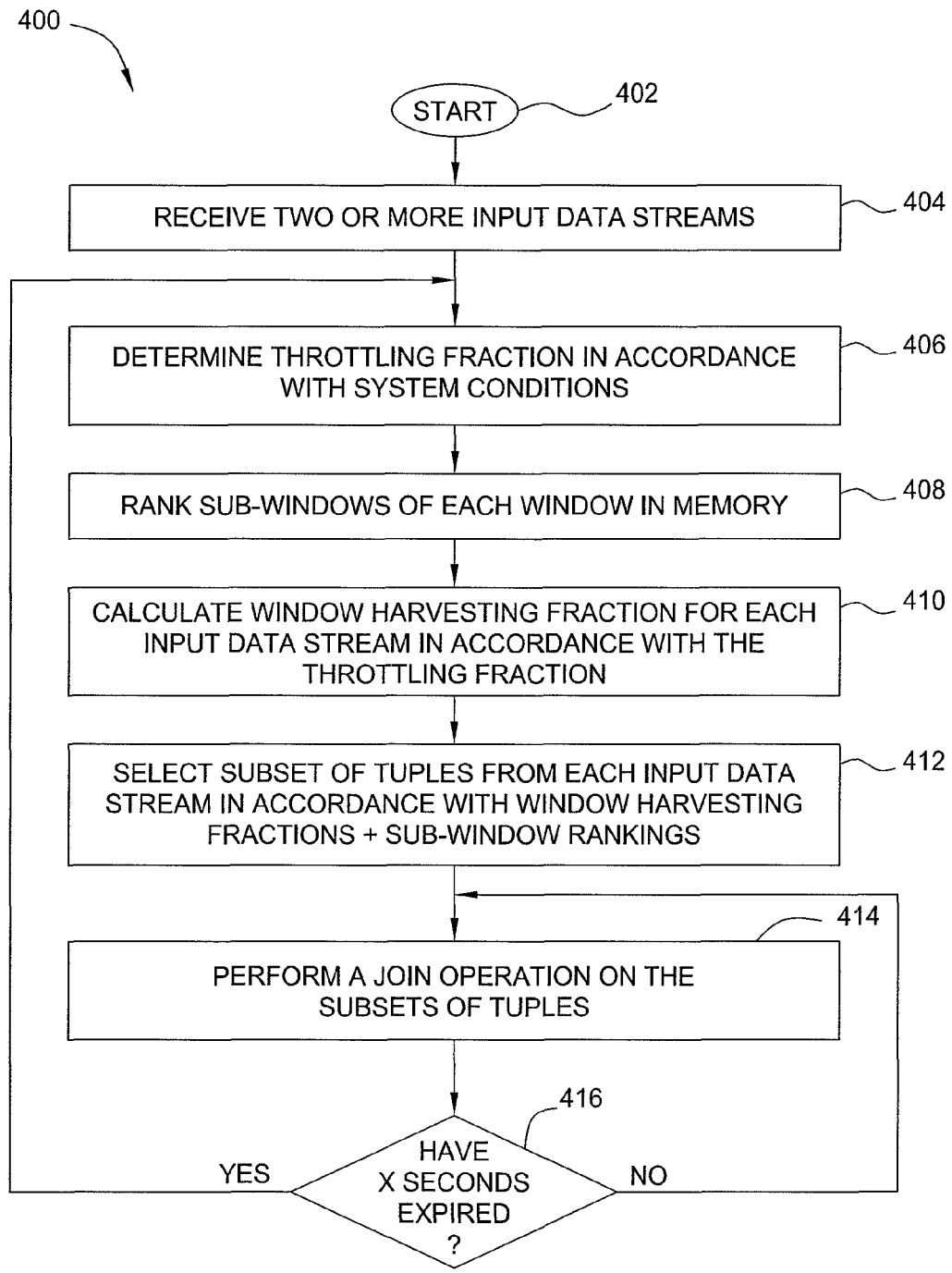
FIG. 4 is a flow diagram illustrating one embodiment of a method for adaptive load shedding for data stream processing, according to the present invention.

FIG. 4 is a flow diagram illustrating one embodiment of a method 400 for adaptive load shedding for data stream processing, according to the present invention. The method 400 may be implemented, for example, at a data stream processing unit such as the data stream processing unit 100 illustrated in FIG. 1 (e.g., as part of the join operation logic 114). The method 400 relies on the novel concept of operator throttling, wherein the adaptive load shedding function is performed by the join operator. The goal is to match the service rate with the input rate of the data streams by performing join operations on a selected subset of tuples from the memory (e.g., windows), as described in further detail below.

The method 400 is initialized at step 402 and proceeds to step 404, where the method 400 receives m (where m≥2) input data streams. The input data streams are each received, for example, within a sliding window of memory as discussed with reference to FIGS. 1 and 2.

The method 400 then proceeds to step 406 and determines a throttling fraction, z, in accordance with current system conditions (e.g., the performance of the join operator under current system load and input data stream rates). Concretely, a throttling fraction of z=Ø means that the adaptive load shedding performed by the join operator should adjust to the processing logic such that the CPU cost of executing the processing logic is reduced to Ø times the original cost. In one embodiment, the throttling fraction has a value in the range of [0, 1].

In one embodiment, the performance, β, of the join operator under the current system load and input data stream rates can be described as:

$$\beta = \frac{\sum_{i=1}^{m} \alpha_i}{\sum_{i=1}^{m} \lambda_i} \quad \text{(EQN. 1)}$$

where $\alpha_i$ is the tuple consumption rate of the join operator for the input data stream $S_i$ and $\lambda_i$ is the arrival rate of the input data stream $S_i$.

The performance, $\beta$, of the join operator is applied to adjust the throttling fraction, z, according to:

$$z = \begin{cases} \beta \cdot z_{current}, & \beta < 1 \\ \min(1, \gamma \cdot z_{current}) & \text{otherwise} \end{cases} \quad \text{(EQN. 2)}$$

where $z_{current}$ is the current value of the throttling fraction, z is thus the new (adjusted) value, and $\gamma$ is the boost factor. The boost factor, $\gamma$, has a value that is greater than one and is used to accelerate the throttling fraction, z, to quickly approach one. Thus, the value of the throttling fraction is directly dependent on the performance, $\beta$, of the join operator. If the value of the performance, $\beta$, of the join operator is less than one, then the throttling fraction, z, is made smaller by adjusting the amount of load shedding to match the tuple consumption rate, $\alpha_i$, of the join operator. In all other cases (i.e., where the value of the performance, $\beta$, of the join operator is greater than or equal to one), the throttling fraction is adjusted upward to the smaller value of: one and ($\gamma \cdot z_{current}$). In this case, the join operator is able to process all of the incoming tuples in accordance with the current throttling fraction.

In one embodiment, the throttling fraction, z, is initially set to a maximum value (e.g., where z has a value in the range of [0, 1], z=1). This initial value represents an optimistic assumption that the join operator is capable of executing fully without any overload. In subsequent iterations of the method 400, described in further detail below, the throttling fraction, z, may be adjusted from this maximum value depending on changes in the performance, $\beta$, of the join operator, as described above with respect to EQN. 2.

In step 408, the method 400 ranks sub-windows in each of the windows of memory (e.g., windows 112 of FIG. 1). Each window is divided into a plurality of smaller sub-windows, which are treated as integral units. In one embodiment, the plurality of sub-windows includes at least one sub-window that is used for tuple expiration. The remaining sub-windows (which may be referred to as "logical sub-windows") are then ranked in accordance with their usefulness in producing outputs (e.g., so that the n-highest ranked logical sub-windows can be subsequently used for join operations, as described in further detail below).

In one embodiment, the sub-windows are ranked by first integrating the join density function between the associated input data stream over the range of a logical sub-window, and then sorting the sub-windows to produce a ranked list. For instance, in one embodiment, $s_{i,j}^v$, $i\epsilon[1, \ldots, m]$, $j\epsilon[1, \ldots, m-1]$, $v\epsilon[1, \ldots, n_{r_{i,j}}]$, such that, for the $i^{th}$ direction of a join operation, an ordering is defined over the logical sub-windows of $j^{th}$ window in the join order (i.e., join window $W_l$, where $l=r_{i,j}$), such that $s_{i,j}^v$ gives the index of the logical sub-window that is ranked v in this ordering. Here, $r_{i,j}$ is used to denote the window index of the $j^{th}$ window of the $i^{th}$ join direction, $R_i$. The ordering defined by $s_{i,j}^v$ is strongly influenced by the time correlations among the input data streams. In essence, this ranking is based on the likelihood of having an output tuple whose encompassed tuples from two input data streams have an offset between their timestamps such that the offset is within the time range of the logical sub-window. This can be computed by integrating the join density function between the input data streams over the range of a logical sub-window.

Figure 5:
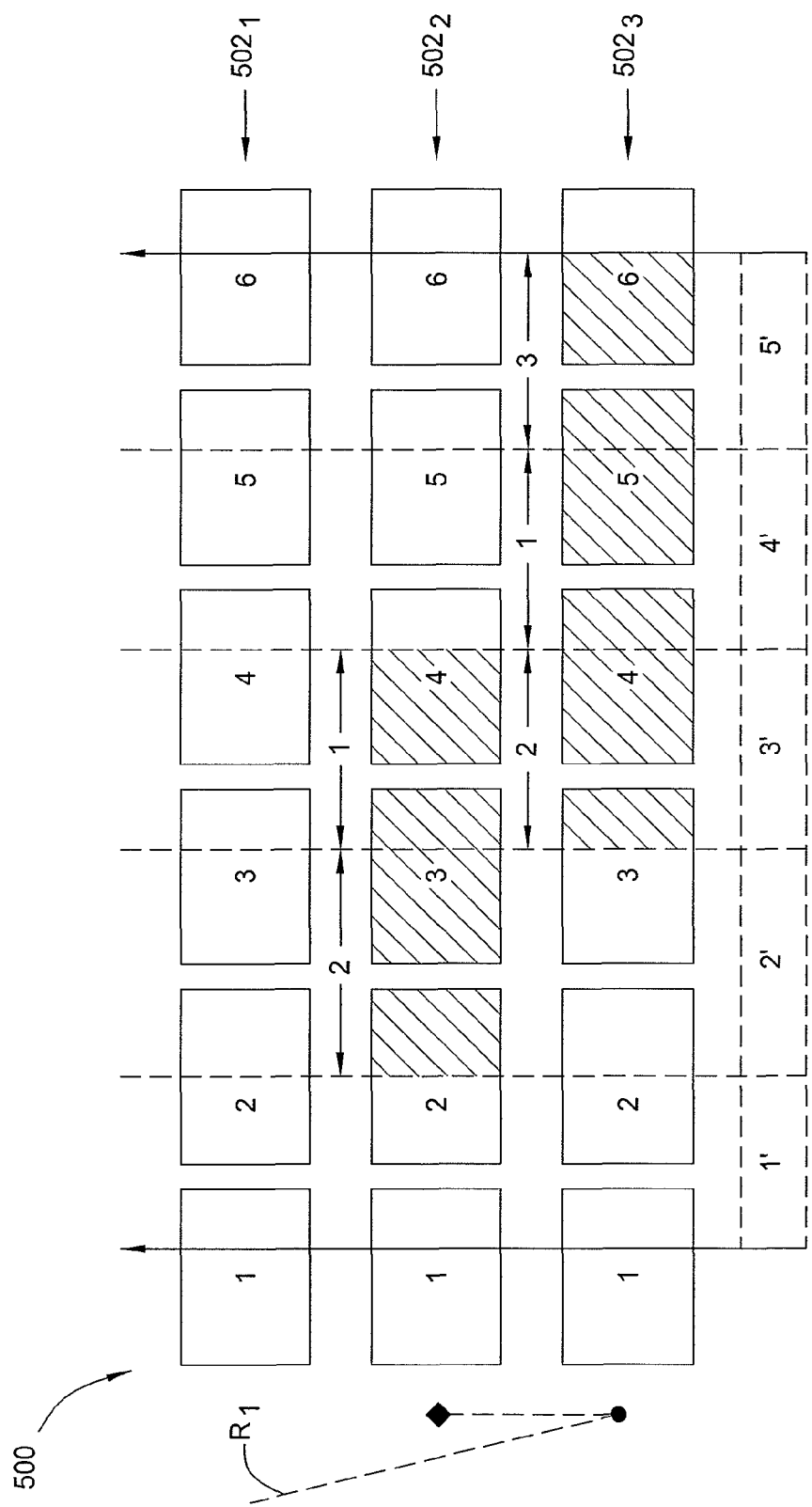
FIG. 5 is a schematic diagram illustrating an exemplary use of sub-windows in a memory unit.

For example, FIG. 5 is a schematic diagram illustrating an exemplary use of sub-windows in a memory unit 500. Specifically, the example in FIG. 5 illustrates the use of sub-windows to perform "window harvesting" (i.e., the selection of subsets of sub-windows) for a windowed, three-way data stream join (i.e., $i\epsilon[1, \ldots, 3]$), for the join direction $R_1=\{3, 2\}$). The windows $502_1$-$502_3$ (hereinafter collectively referred to as "windows 502") for each input data stream are each divided into a total of six sub-windows (numbered 1-6): five logical sub-windows (i.e., $n_i=5$) and one sub-window for tuple expiration. In accordance with the join direction, $R_1$, window $502_3$ is the first window in the join order, and window $502_2$ is the second window in the join order.

Assuming that the throttling fraction, $z_{1,1}$, has been determined to be 0.6, three logical sub-windows from the first window 502 in the join order (i.e., window $502_3$) should be processed. If $s_{1,1}^1=4$, $s_{1,1}^2=3$ and $s_{1,1}^3=5$, the logical basic windows from window $502_3$ that should be selected for processing are the sub-windows numbered 4', 3' and 5' (respectively ranked as 1, 2 and 3). The corresponding portions of the sub-windows are shaded to illustrate that there is a small shift between the logical sub-windows (demarcated by dashed lines) and the actual sub-windows (demarcated by solid lines). Along similar lines, the logical sub-windows numbered 2' and 3' from the window $502_2$ are also offset from the actual sub-windows.

Referring back to FIG. 4, in step 410, the method 400 calculates a window harvesting fraction, $h_{i,j}$ ($i\epsilon[1, \ldots, m]$, $j\epsilon[1, \ldots, m]$) for each of the input data streams, in accordance with the throttling fraction and sub-window rankings. This indicates that, for the $i^{th}$ direction of the join operation, the fraction of the $j^{th}$ window in the join order (e.g., window $W_l$, where $l=r_{i,j}$) is determined by the window harvesting fraction $h_{i,j}$. Each window will be associated with its own window harvesting fraction, $h_{i,j}$, (as opposed to the throttling fraction, z, which applies to all windows), thus, in total, there are m(m−1) different window harvesting fractions, $h_{i,j}$.

The basic idea of window harvesting, which is a load shedding technique performed by a join operator, is to use only certain segments of the memory windows (e.g., sub-windows or segments of sub-windows) for processing, as dictated by the throttling fraction, z. The choice of which segments to use relies at least in part on time correlations among the input data streams, thus maximizing the output rate of the join. Thus, the window harvesting fraction accounts for both the throttling fraction, z, and the time correlations among the input data streams.

To determine the window harvesting fraction, it is first necessary to see that the CPU cost of performing the join operation agrees with the throttling fraction, z. In other words, the cost of performing the join operation should be less than or equal to approximately z times the cost of performing the full (i.e., unthrottled) join operation. If C(1) denotes the cost of performing the full join operation, then the cost for performing the join operation in accordance with a given set of window harvesting fractions can be denoted as: $C(\{h_{i,j}\})$. Thus, a particular set of window harvesting fractions is feasible if and only if $z \cdot C(1) \geq C(\{h_{i,j}\})$.

Secondly, among the set of feasible window harvesting fractions, one is chosen that results in the maximum output rate. If $O(\{h_{i,j}\})$ is the output rate of the join operator for the given setting of window harvesting fractions, then the objective is to maximize the output, $O(\{h_{i,j}\})$, such that $z \cdot C(1) \geq C(\{h_{i,j}\})$.

The total cost, C, is equal to the sum of the costs of the individual join directions, where the cost of performing the join operation in the $i^{th}$ direction is $\lambda_i$ times the number of tuple comparisons made for processing a single tuple from the input data stream $S_i$. Thus, the total cost, C is:

$$C = \sum_{i=1}^{m} (\lambda i \cdot C_i) \quad \text{(EQN. 3)}$$

where $C_i$ is the sum of the number of tuple comparisons made for processing each window in the join order $R_i$.

The number of tuple comparisons performed for the $j^{th}$ window, $W_{r_{i,j}}$, in the join order, $R_i$, is equal to the number of times, $N_{i,j}$, over which the $j^{th}$ window, $W_{r_{i,j}}$, is iterated for evaluating the $i^{th}$ direction of the join operation times the number of tuples used from the $j^{th}$ window, $W_{r_{i,j}}$. If the number of tuples, $T_{i,j}$, in the $j^{th}$ window, $W_{r_{i,j}}$, can be denoted as:

$$T_{i,j} = \lambda_{r_{i,j}} \cdot w_{r_{i,j}} \quad \text{(EQN. 4)}$$

then the number of tuples used from the $j^{th}$ window, $W_{r_{i,j}}$, can be calculated as $h_{i,j} \cdot T_{i,j}$, where $w_{r_{i,j}}$ is the size of the window, $W_{r_{i,j}}$, measured in seconds. Thus, the sum, $C_i$, of the number of tuple comparisons made for processing each window in the join order $R_i$ is:

$$C_i = \sum_{j=1}^{m-1} (z_{i,j} \cdot T_{i,j} \cdot N_{i,j}) \quad \text{(EQN. 5)}$$

The number of times, $N_{i,j}$, over which the $j^{th}$ window, $W_{r_{i,j}}$, is iterated for evaluating the $i^{th}$ direction of the join operation is equal to the number of partial join results produced by processing only the first (j−1) windows in the join order $R_i$. A base case is $N_{i,1}=1$. Thus, $N_{i,2}$, which is the number of partial join results produced by processing $W_{r,1}$, is equal to $(P_{i,1} \cdot \sigma_{i,r_{i,1}} \cdot T_{i,1})$, where $P_{i,1}$ is a yield factor that accounts for the fact that only $h_{i,j}$ fraction of $W_{r_{i,j}}$ is processed, $\sigma_{ir_{i,1}}$ denotes the selectivity between the windows $W_i$ and $W_{r_{i,j}}$, and $T_{i,1}$ is the number of tuples in the first window, $W_{r_{i,j}}$, of the $i_{th}$ join direction.

If the probability density functions capturing the time correlations among the streams are flat, then the yield factor, $P_{i,j} = h_{i,j}$. By noting that $j \geq 2$, the recursion rule can be written as:

$$N_{i,j} = \prod_{k=1}^{j-1} (P_{i,k} \cdot \sigma_{i,r_{i,j}} \cdot T_{i,k}) \quad \text{(EQN. 6)}$$

In the formulation of the yield factor, $P_{i,j}$, it can be assumed for the sake of brevity that $h_{i,j}$ is a multiple of logical sub-windows. Thus, the yield factor, $P_{i,j}$, may be written as:

$$P_{i,j} = \frac{\sum_{k=1}^{h_{i,j} \cdot n_{r_{i,j}}} p_{i,j}^{s_{i,k}^k}}{\sum_{k=1}^{n_{r_{i,j}}} p_{i,j}^k} \quad \text{(EQN. 7)}$$

where k is a logical sub-window in a window i or j ($i \in [1, \ldots, m]$, $j \in [1, \ldots, m]$), $n_i$ denotes the number of sub-windows for the window I, and k is an index in the summation.

To calculate the yield factor, $P_{i,j}$, a scaled version of the harvesting fraction, $h_{i,j}$, (the sum of the scores of the logical sub-windows selected, divided by the sum of the scores from all of the logical sub-windows) is used. Note that $p^k_{i,j}$, a logical sub-window score, is calculated from the time correlation probability density function, $f_{i,j}$. If the probability density function, $f_{i,j}$, is flat, then the associated logical sub-window's score, $p^k_{i,j} = 1/n_{r_{i,j}}$, $\forall k \in [1, \ldots, n_{r_{i,j}}]$ and, as a consequence, the yield factor, $P_{i,j} = h_{i,j}$, as discussed above. Otherwise, $P_{i,j} > h_{i,j}$.

This means that one can obtain $P_{i,j}$ fraction of the total number of matching tuples from the $j^{th}$ window, $W_{r_{i,j}}$, in the join order, $R_i$, by iterating over only $h_{i,j} < P_{i,j}$ fraction of $W_{r_{i,j}}$. This is a result of selecting the logical sub-windows that are relatively more valuable for producing join output. This is accomplished by utilizing the sub-window rankings during the selection of sub-windows (i.e., the rankings are calculated from logical sub-window scores).

The total output rate, O, of the join can be easily formulated in accordance with the numbers of times, $N_{i,j}$, over which the $j^{th}$ windows, $W_{r_{i,j}}$, are iterated for evaluating the $i^{th}$ directions of the join operation. Recalling that number of times, $N_{i,j}$, over which the $j^{th}$ window, $W_{r_{i,j}}$, is iterated for evaluating the $i^{th}$ direction of the join operation is equal to the number of partial join results produced by processing only the first (j−1) windows in the join order, $R_i$, one can conclude that $N_{i,m}$ is the number of output tuples produced by fully executing the $i^{th}$ join direction. Thus:

$$O = \sum_{i=1}^{m} (\lambda_i \cdot N_{i,m}) \quad \text{(EQN. 8)}$$

One way to solve the optimal window harvesting problem is to enumerate all possible window harvesting fraction settings, assuming that the window harvesting fractions are set so that an integral number of logical sub-windows are selected. Although straightforward to implement, this brute-force approach will require the consideration of $\Pi_{i=1}^{m} n_i^{m-1}$ possible configurations. If one has $\forall i \in [1, \ldots, m]$, $n_i = n$, then $\Pi_{i=1}^{m} n_i^{m-1}$ can be simplified as $O(n^{m^2})$. Computationally, this would be expensive due to the amount of time required to solve the optimization problem with enumeration, making it almost impossible to perform frequent adaptation. Accordingly, another embodiment of a method for setting window harvesting fractions is described in further detail below with reference to FIG. 6.

In step 412, the method 400 selects a subset of tuples from each of the input data streams, in accordance with the window harvesting fraction calculated for the respective input streams. The selection of sub-windows for join operations must satisfy one constraint: the cost of the resultant join must substantially match the throttling fraction, z.

In step 414, the method 400 performs a join operation on the selected subsets of tuples. The method then proceeds to step 416 and determines whether x seconds have expired. If the method 400 concludes in step 416 that x seconds have expired, the method 400 returns to step 406 and proceeds as described above in order to determine a new throttling fraction based on the current (new) system parameters. Alternatively, if the method 400 concludes in step 416 that x seconds have not expired, the method 400 returns to step 414 and proceeds as described above to perform join operations in accordance with the current throttling and window harvesting fractions. In this manner, the method 400 iterates over fixed time intervals, so that the throttling and harvesting fractions applied to the input data streams are consistently optimal for the system parameters at any given time.

The method 400 thus allows all incoming data streams to be received in memory, but reduces the amounts of the data streams that are used for data stream operations by selecting only a subset of the tuples contained within the received data streams for processing (e.g., based on available processing resources and on one or more characteristics of the subset of tuples). This operator throttling technique stands in contrast to conventional stream throttling techniques that reduce the input rates of the data streams (e.g., by performing tuple dropping). The method 400 thus makes it possible for load shedding to be performed in an "intelligent" (e.g., non-arbitrary) manner, thereby maximizing the quality of the data stream operation output.

Those skilled in the art will appreciate that the concepts of operator throttling and window harvesting, as taught by the method 400, are general and may be implemented to enhance the operation of operators other than join operators. For example, a data compression operator could decrease its compression ratio using a throttling fraction, or an aggregate operator could apply a throttling fraction to adjust its aggregate re-evaluation interval to shed load.

Figure 6:
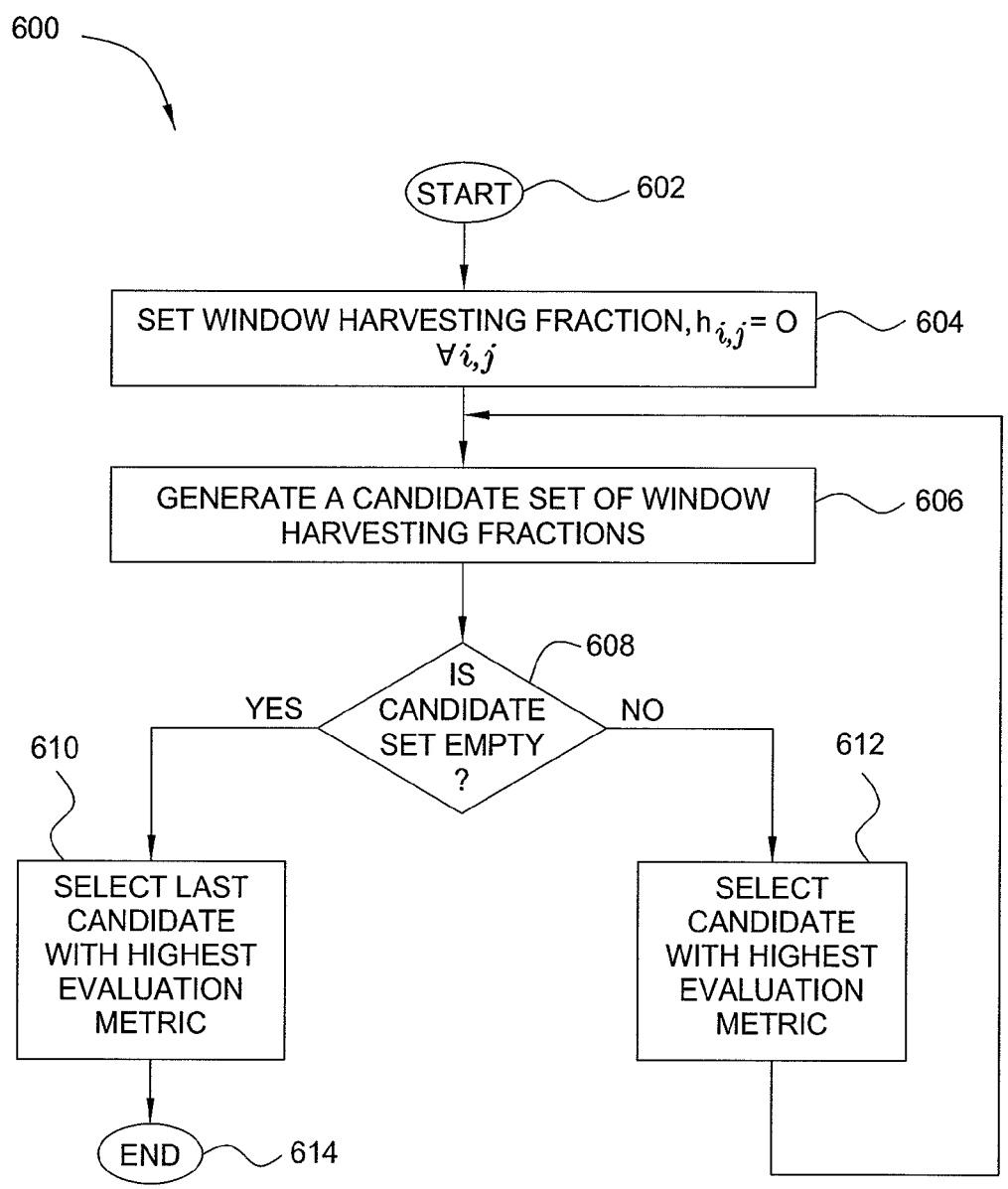
FIG. 6 is a flow diagram illustrating one embodiment of a method for setting window harvesting fractions, according to the present invention.

FIG. 6 is a flow diagram illustrating one embodiment of a method 600 for setting window harvesting fractions, according to the present invention. The method 600 is a heuristic method that is greedy in nature. The method 600 is initialized at step 602 and proceeds to step 604, where the method 600 initially sets the window harvesting fraction, $h_{i,j}$, to zero, $\forall i,j$.

In step 606, the method 600 generates a candidate set of window harvesting fractions. The candidate set is a set of potential settings (or candidates) for all of the window harvesting fractions (e.g., a set that considers the respective window harvesting fractions for each window). In one embodiment, any candidate in the candidate set increases the values of the window harvesting fractions, $h_{i,j}$ (i.e., $h_{i,j} \geq h_{i,j}^{current}$, $\forall i,j$, where $h_{i,j}^{current}$ is the current setting of the window harvesting fractions, and $h_{i,j}$ is the adjusted setting). Each candidate in the candidate set is associated with an evaluation metric, as discussed in greater detail below.

In one embodiment, the candidate set is generated by adding a new candidate (setting) to an existing candidate set. For the $i^{th}$ direction of a join operation and the $j^{th}$ window within the join order $R_i$, the new candidate is created by incrementing the window harvesting fraction, $h_{i,j}$, by $d_{i,j}$, where $d_{i,j}=1/n_{r_{i,j}}$, to produce a new set of window harvesting fraction settings. This corresponds to increasing by one the number of logical sub-windows selected for processing. This also results in m(m−1) different candidates in the candidate set, which is also the maximum size of the candidate set. The candidate set is then filtered to remove the candidates that are infeasible (e.g., do not satisfy the processing constraint of the optimal window harvesting problem dictated by the throttling fraction, z). In one embodiment, any incremented candidates that are determined to be infeasible are frozen so that no further settings in which those candidates are incremented are considered in future iterations of the method 600.

One potential complication to this method of generating candidate sets is that when one has $h_{i,j}=0$, $\forall j$ for the $i^{th}$ join direction, it typically makes little sense to create a candidate in which only one window harvesting fraction is non-zero. This is because no join operation output can be produced from a join direction if there are one or more windows in the join order for which the window harvesting fraction is set to zero. Thus, a join direction is considered not to be initialized if and only if there is a window, j, such that the window harvesting fraction, $h_{i,j}=0$. If, at the start of step 606, there is a join direction that is not initialized, only one candidate is generated in which all of the window harvesting fractions for that un-initialized join direction are incremented (e.g., rather than creating (m−1) candidates for the join direction).

In step 608, the method 600 determines whether the candidate set is empty. If the method 600 concludes in step 608 that the candidate set is empty, the method 600 proceeds to step 610 and selects (as the new setting for the window harvesting fractions) from a previous candidate set the candidate that has the highest evaluation metric. In one embodiment, the evaluation metric is a measure of the candidate whose application will result in the highest join output, $O(\{h_{i,j}\})$ (i.e., best output). In another embodiment, the evaluation metric is a measure of the candidate whose application will result in the highest join output to join cost ratio, $O(\{h_{i,j}\})/C(\{h_{i,j}\})$ (i.e., best output per cost). In another embodiment, the evaluation metric is a measure of the candidate whose application will result in the highest additional output to additional cost ratio, $$\frac{O(\{z_{i,j}\}) - O(\{z_{i,j}^{current}\})}{C(\{z_{i,j}\}) - C(\{z_{i,j}^{current}\})},$$

where $h_{i,j}^{current}$ is the current setting of the window harvesting fractions and $h_{i,j}$ is the candidate being evaluated.

Once the candidate with the highest evaluation metric has been identified and selected for application, the method 600 then terminates in step 614.

Alternatively, if the method 600 concludes in step 608 that the candidate set is not empty, the method 600 proceeds to step 612 and selects (as the new setting for the window harvesting fractions) from the candidate set the candidate that has the highest evaluation metric (e.g., in accordance with any of the evaluation metrics described above). The method 600 then returns to step 606 and proceeds as described above in order to generate a new candidate set of window harvesting fractions for evaluation.

When evaluating candidates in the candidate sets, it should be noted that the time correlations among the input data streams can be learned by monitoring the output of the join operator. Recall that the time correlations are captured by the probability density function, $f_{i,j}$, where $i,j \in [1, \ldots, m]$. If $f_{i,j}$ is defined as the probability density function of the difference in the timestamps of the tuples $t^{(i)} \in S_i$ and $t_{(j)} \in S_j$ encompassed in an output tuple of the join, $f_{i,j}$ can be approximated by building a histogram on the difference (by analyzing the output tuples produced by the join algorithm).

Although this approximation method is fairly straightforward, it is subject to two main shortcomings. First, since window harvesting uses only certain portions of the windows for processing, changing time correlations are difficult to capture. Second, for each output tuple of the join operation, $O(m^2)$ histograms must be updated to approximate all of the probability density functions, which hinders performance.

The first shortcoming (i.e., capturing changing time correlations) can be addressed by implementing window shredding, rather than window harvesting, for the join operation for a randomly sampled subset of tuples. A sampling parameter, $\omega$, is defined such that, on the average, window shredding is performed for only w fraction of the tuples. In one embodiment, $\omega$<0.1. Window shredding is then performed by executing the join operation fully, except that the first window in the join order of a given join direction is processed only partially, based on the throttling fraction, z. The tuples to be used from these first windows are selected so that they are roughly evenly distributed within the window's associated time range. In this way, the bias introduced in the output due to window harvesting is reduced, and the output generated can be reliably used to build histograms to capture the time correlations. Moreover, since window shredding only processes z fraction of the first windows in the join orders, it respects the processing constraint of the optimal window harvesting problem.

The second shortcoming (i.e., histogram updates) can be addressed by implementing per stream histograms, rather than m(m−1) histograms. In particular, only one histogram per stream (i.e., m histograms) is maintained. The histogram associated with the stream $S_i$ is denoted by $H_i$ and is an approximation to the probability density function $f_{i,1}$.

The maintained histograms are updates only for the output tuples generated from window shredding, which introduced minimal overhead but necessitates developing a new method to calculate logical sub-window scores from the m histograms. If the score of a sub-window, k, is denoted as $p^k_{i,j}$, the score may be defined as:

$$p^k_{i,j} = \int_{b(k-1)}^{bk} f_{i,r_{i,j}}(x)dx \quad \text{(EQN. 8)}$$

Since histograms are not maintained for all probability density functions, $f_{i,j}$ logical sub-window scores must be calculated in a manner that is less dependent on this parameter.

In one embodiment, it is first assumed that the m histograms are equal-width histograms, although other types of histograms are contemplated. The histogram $H_i$ that is associated with the stream $S_i$ has a valid time range of $[-w_i, w_1]$, which is the input domain of the probability density function, $f_{i,1}$. The frequency for time range I is denoted as $H_i(I)$, and the frequency for the higher and lower points of the $k^{th}$ bucket's time range are respectively denoted as $H_i[k^*]$ and $H_i[k_*]$. From EQN. 8, one gets:

$$p^k_{i,j} = P\{A_{i,j} \in b[k-1,k]\} \quad \text{(EQN. 9)}$$

where $l = r_{i,j}$ and $A_{i,j}$ represents the difference in the timestamps of tuples from stream $S_i$ and stream $S_j$ encompassed in an output tuple of the join operation.

For the case of i=1, nothing that $A_{i,j} = -A_{i,j}$, hence $p^k_{i,j} = P\{A_{l,1} \in b[-k,-k+1]\} \approx H_l(b[-k,-k+1])$.

For the case of i≠1, $A_{i,j} = -A_{i,1} - A_{l,1}$ hence $p^k_{i,j} = P\{(A_{i,1} - A_{l,1}) \in b[k-1,k]\}$. Making the simplifying assumption that $A_{l,1}$ and $A_{i,1}$ are independent, one can approximate $p^k_{i,j}$ as follows:

$$p^k_{i,j} = \sum_{v=1}^{|H_1|} (H_l[v] \cdot H_l(b \cdot [k-1,k] + \frac{H_l[v^*] + H_l[v_*]}{2}) \quad \text{(EQN. 10)}$$

where v is an index in the summation. Thus, one only need to capture the probability density function, $f_{i,1}, \forall i \in [1, \ldots, m]$ to calculate all $p^k_{i,j}$ values. This is achieved by maintaining $H_i$ for approximating $f_{i,1}$.

Thus, the present invention represents a significant advancement in the field of data stream processing. The present invention allows all incoming data streams to be received in memory, but selects only a subset of the tuples contained within the received data streams for processing, based on available processing resources and on one or more characteristics of the subset of tuples. The invention thus makes it possible for load shedding to be performed in an "intelligent" (e.g., non-arbitrary) manner, thereby maximizing the quality of the data stream operation output.

While foregoing is directed to the preferred embodiment of the present invention, other and further embodiments of the invention may be devised without departing from the basic scope thereof, and the scope thereof is determined by the claims that follow.

The invention claimed is:

1. A method for processing data streams, the method comprising:
   receiving at least two data streams into respective sliding windows of memory;
   calculating a cost of executing processing logic for processing the at least two data streams, wherein the cost indicates an amount of processing resources that is consumed by the executing;
   calculating a throttling fraction, wherein the throttling fraction specifies an amount by which to reduce the cost of executing the processing logic; and
   selecting tuples from said at least two data streams for processing, where said selected tuples represent a subset of all tuples contained within said sliding windows, and where said selecting accounts for said throttling fraction and for a time correlation among the at least two data streams,
   wherein at least one of: the calculating the cost, the calculating the throttling fraction, or the selecting is performed by a processor.

2. The method of claim 1, further comprising:
   performing a data stream join operation on said selected tuples.

3. The method of claim 1, wherein said throttling fraction is re-calculated on a periodic basis.

4. The method of claim 1, wherein said calculating the throttling fraction comprises:
   computing a tuple consumption rate representing a sum of rates at which tuples from said at least two data streams are consumed by said processing;
   computing an input rate representing a sum of rates at which said at least two data streams are received for said processing; and
   dividing said tuple consumption rate by said input rate to produce a performance metric.

5. The method of claim 4, further comprising:
   setting said throttling fraction equal to a product of the performance metric and a currently used throttling fraction, if said performance metric is less than one; and
   setting said throttling fraction equal to a smaller value of: one and a product of said currently used throttling fraction and a boost factor, if said performance metric is not less than one.

6. The method of claim 1, wherein said selecting comprises:
   determining a window harvesting fraction for each of said sliding windows, in accordance with said throttling fraction.

7. The method of claim 6, wherein said determining comprises:

identifying, for each of said sliding windows, a fraction of said tuples that, if processed, will maximize an output of said processing while rendering a cost of said processing less than or equal to said throttling fraction multiplied by a cost of processing all of said tuples.

8. The method of claim 7, wherein said identifying comprises:
dividing each of said sliding windows into one or more sub-windows; and
ranking said one or more sub-windows according to how useful each of said one or more sub-windows is in producing said output.

9. The method of claim 8, wherein said ranking comprises:
performing a join operation on a sample of tuples from each of said one or more sub-windows; and
maintaining one or more histograms representative of an output of said join operation.

10. The method of claim 6, wherein said determining comprises:
setting said window harvesting fraction for each of said sliding windows to zero;
generating one or more candidate sets, each of said one or more candidate sets comprising a potential window harvesting fraction for each of said sliding windows;
selecting from said one or more candidate sets a candidate set having a highest evaluation metric.

11. The method of claim 10, wherein said selecting comprises:
removing from among said one or more candidate sets any candidate set that fails to satisfy one or more processing constraints.

12. The method of claim 10, wherein said generating comprises selecting an existing candidate set, said existing candidate set specifying a number of logical sub-windows to be used for said processing; and
producing a new candidate set in which said number of logical sub-windows to be used for said processing is increased by one.

13. The method of claim 10, wherein said evaluation metric is a measure of a candidate set from among said one or more candidate sets that will result in a highest join output.

14. The method of claim 10, wherein said evaluation metric is a measure of a candidate set from among said one or more candidate sets that will result in a highest join output to join cost ratio.

15. The method of claim 10, wherein said evaluation metric is a measure of a candidate set from among said one or more candidate sets that will result in a highest additional output to additional cost ratio.

16. The method of claim 1, wherein the throttling fraction is based on input rates associated with said at least two data streams.

17. The method of claim 16, wherein the throttling fraction is further based on currently available processing resources.

18. A computer readable storage device containing an executable program for processing data streams, where the program performs the steps of:
receiving at least two data streams into respective sliding windows of memory;
calculating a cost of executing processing logic for processing the at least two data streams, wherein the cost indicates an amount of processing resources that is consumed by the executing;
calculating a throttling fraction based on input rates associated with said at least two data streams and on currently available processing resources, wherein the throttling fraction specifies an amount by which to reduce the cost of executing the processing logic; and
selecting tuples from said at least two data streams for processing, where said selected tuples represent a subset of all tuples contained within said sliding windows, and where said selecting accounts for said throttling fraction and for a time correlation among the at least two data streams.

19. A data stream processing unit comprising:
a memory for receiving at least two data streams into respective sliding windows of memory;
a storage device containing program logic for calculating a cost of executing processing logic for processing the at least two data streams, wherein the cost indicates an amount of processing resources that is consumed by the executing and for calculating a throttling fraction based on input rates associated with said at least two data streams and on currently available processing resources, wherein the throttling fraction specifies an amount by which to reduce the cost of executing the processing logic; and
a processor for selecting tuples from said at least two data streams for processing, where said selected tuples represent a subset of all tuples contained within said sliding windows, and where said selecting accounts for said throttling fraction and for a time correlation among the at least two data streams.

20. The method of claim 1, wherein the selecting determines, for a logical subdivision of one of the one or more sliding windows, a likelihood of an output tuple produced by the processing comprising a first tuple selected from a first one of the at least two data streams and a second tuple selected from a second one of the at least two data streams, wherein an offset between timestamps of the first tuple and the second tuple is within a time range spanned by the logical subdivision.

* * * * *